(12) United States Patent
Nishikimi et al.

(10) Patent No.: US 6,652,041 B2
(45) Date of Patent: Nov. 25, 2003

(54) HYDRAULIC PRESSURE CONTROL DEVICE FOR VEHICLE AND VEHICLE BRAKE SYSTEM USING THE SAME

(75) Inventors: Makoto Nishikimi, Kariya (JP); Keita Nakano, Kariya (JP); Masato Yoshino, Kariya (JP)

(73) Assignees: Advics Co., Ltd., Kariya (JP); Sumitomo (SEI) Brake Systems, Inc., Hisai (JP)

( * ) Notice: Subject to any disclaimer, the term of this patent is extended or adjusted under 35 U.S.C. 154(b) by 0 days.

(21) Appl. No.: 10/050,719

(22) Filed: Jan. 18, 2002

(65) Prior Publication Data

US 2002/0096937 A1 Jul. 25, 2002

(30) Foreign Application Priority Data

Jan. 23, 2001 (JP) ..................................... 2001-014082
Nov. 21, 2001 (JP) ..................................... 2001-356328

(51) Int. Cl.⁷ .................................................. B60T 8/36
(52) U.S. Cl. ................................................. 303/117.1
(58) Field of Search ............................ 303/117.1, 191, 303/DIG. 1, DIG. 2, 119.1, 119.2

(56) References Cited

U.S. PATENT DOCUMENTS 3,910,645 A * 10/1975 Takeuchi et al. ......... 303/117.1

6,203,123 B1 * 3/2001 Oyama ........................ 303/191
2001/0006308 A1 * 7/2001 Kawahata et al. .......... 303/122

FOREIGN PATENT DOCUMENTS

| EP | 0 908 365 A2 | 4/1999 |
| JP | 2000-326839 A | 11/2000 |
| JP | 2000-326839 | * 11/2000 |

* cited by examiner

*Primary Examiner*—Christopher P. Schwartz
(74) *Attorney, Agent, or Firm*—Burns, Doane, Swecker & Mathis, LLP

(57) ABSTRACT

A hydraulic pressure control device is proposed in which using a proportional pressure control valve having a built-in spool valve, the hydraulic pressure for wheel brakes is adjusted to a value corresponding to the magnitude of an external force applied to the spool valve, non-electrical pressure adjustment can be done both in a normal state and in an emergency, and the structure is simplified. The brake pedal is coupled through a spring to the spool valve of the proportional pressure control valve having a solenoid for generating a spool-driving force, and the brake pedal force is applied to the spool valve as an external force so that not only in an emergency but in a normal state, pressure is adjusted by the brake pedal force.

8 Claims, 10 Drawing Sheets

HYDRAULIC PRESSURE CONTROL DEVICE FOR VEHICLE AND VEHICLE BRAKE SYSTEM USING THE SAME

BACKGROUND OF THE INVENTION

This invention relates to a hydraulic pressure control device for a vehicle, particularly one including an electronic control device to compute optimum braking conditions based on information from various sensors to make possible various controls such as applying brakes even while the driver is not operating brakes, generating braking force larger than the amount the driver is operating to produce, or lowering the braking force even though the driver has no intension of relaxing the brakes, with a simple structure. This invention also relates to a vehicle brake system using it.

A so-called brake-by-wire type vehicle brake system has been developed in which in order to electrically control braking forces applied to the vehicle, the amount of braking applied by the driver and the hydraulic pressure generated by the brake operation are converted to electric signals and the hydraulic pressure generated in the power line (that is, pressure source including a power-driven pump) is adjusted to a value corresponding to the electric signals and supplied to the wheel brakes.

Also, in a general one of brake systems of this kind, if a solenoid valve in the passage connecting the power line with the wheel brakes should not open due to failure of electric line, even if pressure is accumulated in the power line, it becomes impossible to effectively use it for braking. Thus, the present inventors have developed a brake system as shown in FIG. 10.

In the device of FIG. 10, a proportional pressure control valve 60 is provided in a passage 49 extending from a pressure source 50 provided with pumps 46 driven by a motor 45, a pressure accumulator 47 and a hydraulic pressure sensor 48 to the wheel brakes 38 (added symbols specify the respective wheels, namely FR shows front right wheel; FL, front left wheel; RR, rear right; and RL, rear left). When the brake pedal 31 is depressed, a passage 34 extending from a master cylinder 32 to the wheel brakes 38 is shut off with a solenoid valve 35, the amount of applying the brake pedal 31 and the hydraulic pressure generated in the master cylinder 32 are detected by a stroke sensor 44 and a hydraulic pressure sensor 39, respectively, and converted to electric signals in an electronic control device 40, and a current corresponding to the electric signals is supplied to the proportional pressure control valve 60 to adjust the hydraulic pressure for the wheel brakes 38 to a value corresponding to the brake operating amount with the proportional pressure control valve 60.

In the proportional pressure control valve 60, as shown in FIG. 11, a spool valve 62 is inserted in a housing 61 having an input port 61a, output port 61b and discharge port 61c. The spool valve 62 is driven by a magnetic force generated by activating a coil 66a of a solenoid 66 to selectively connect the output port 61b to the input port 61a or the discharge port 61c and adjust the degrees of opening of passages formed between a shoulder portion on the outer periphery of the spool valve 62 and edge portions of the respective ports. The spool valve 62 has opposed pressure-bearing surfaces having a difference in area which is equal to the sectional area of a pin 65 inserted into a pin hole 64. Thus, assuming that the hydraulic pressure P introduced through the input port 61a is P, the force of a return spring 63 is F, the current supplied to the coil 66a is I, and the sectional area of the pin 65 is S, the thrust force acting against the spool valve 62 balances at the position where the following formula is met:

$$P \cdot S + F = aI^2 \text{ (a is a constant)}$$

and the spool valve 62 stops at this position.

Replacing the above formula, $$P = (a \cdot I^2 - F)/S$$

In this formula, a and S are constants. If the spring constant is ignored, F can also be regarded as a constant. Thus, the hydraulic pressure P is proportional to the square of the current I and depends on the amount of applying the brake pedal 31.

In the system of FIG. 10, if the electromagnetic force is not produced in the proportional pressure control valve 60 due to failure of the electric line, a solenoid valve 43 in a passage 42 opens, so that the hydraulic pressure generated in the master cylinder 32 acts on the proportional pressure control valve 60. By the hydraulic pressure, an auxiliary piston 67 in FIG. 11 is pushed and the movement of the auxiliary piston 67 is transmitted to the spool valve 62 to adjust the position of the spool valve. Thus, the hydraulic pressure in the pressure source 50 is adjusted by the proportional pressure control valve 60, supplied to boost pistons 36 of FIG. 10, and the hydraulic pressure generated by the boost pistons 36 is supplied to the wheel brakes 38. Thus, even if the proportional pressure control valve 60 cannot be driven with a magnetic force, it is possible to apply the brakes by effectively using the hydraulic pressure in the pressure source 50.

Among brake systems developed by the present inventors, there is one in which during failure of the electric line or if the amount of applying the brake pedal exceeds a predetermined amount, the proportional pressure control valve (spool valve) is driven by the brake pedal force.

JP patent publication 2000-326839 also discloses a system in which during failure of the electric line, the spool valve is driven by the brake pedal force.

The brake system of FIG. 10, which was developed by the present inventors, needs a master cylinder and a plurality of solenoid valves. It also needs a stroke simulator 52 of FIG. 10 for taking in brake fluid fed from the master cylinder while the system is operating normally, and a solenoid valve 51 that closes the inlet side passage of the simulator during failure of the electric line. This incurs complicatedness of the structure and cost increase.

With the earlier developed system in which the spool of the proportional pressure control valve can be moved by the brake pedal in an emergency, since the spool is driven by the brake pedal only in an emergency in which the spool cannot be driven with an electromagnetic force or if the amount of applying the brake pedal exceeds a predetermined amount, electronic control is indispensable during normal braking. For one in which the spool is driven by the brake pedal in an emergency, a clutch for separating the spool valve from the brake pedal in a normal state is needed. On the other hand, one in which the spool is driven by the brake pedal after the amount of applying the brake pedal has exceeded a predetermined amount has a problem that responsiveness lowers in an emergency.

The system disclosed in JP publication 2000-326839 is also provided with a mechanism for preventing the movement of the brake pedal from being transmitted to the spool valve in a normal state. This complicates the structure. Also, with this system, since a hydraulic pressure generating device for adjusting pressure is provided independently of the brake pedal and the brake pedal force is transmitted to a lever in the hydraulic pressure generating device through a wire, the layout of the instruments is also complicated.

Thus, in view of reliability and cost, it is required to reduce elements that can cause a failure and cost increase and to improve responsiveness not only in a normal state but in an emergency.

On the other hand, if one tries to perform various kinds of controls, it is necessary that both control based on the intension of the driver and control by judgment of the electronic control device, separate from the intension of the driver, can be performed.

An object of this invention is to answer these requirements with a system that employs a proportional pressure control valve and is simple in structure.

SUMMARY OF THE INVENTION

According to this invention, there is provided a hydraulic pressure control device for a vehicle comprising a housing formed with an input port, an output port and a discharge port, a proportional pressure control valve having a spool valve and a return spring for biasing the spool valve, the spool valve being adapted to bring the output port into communication with the discharge port and shut off the input port while not in operation, a solenoid for generating a spool-driving force corresponding to a current supplied thereto, and a spring through which the brake pedal is coupled to the spool valve of the proportional pressure control valve, the spool valve being moved to a balance point where the spool-driving force produced by the solenoid, a thrust force produced when the spool valve bears introduced hydraulic pressures on its opposed pressure-bearing surfaces having a difference in area, and the force of the return spring, balance with an external force applied opposite thereto, to change over the connection between the output port and the discharge port and adjust the degree of opening of a passage therebetween and change over the connection between the input port and the output port and adjust the degree of opening of a passage therebetween, whereby both non-electrical pressure adjustment by the operation of the brake pedal and electrical pressure adjustment by the solenoid can be done.

For such a device, the following arrangements 1)–4) are conceivable.
1) The solenoid is a pressure-increasing solenoid and the driving force produced by the solenoid is applied to the spool valve in the same direction as the spool-push-in force by the brake pedal.
2) The solenoid is a pressure-reducing solenoid and the driving force produced by the solenoid is applied to the spool valve in the opposite direction to the spool-push-in force by the brake pedal.
3) The proportional pressure control valve is adapted to have its output characteristics offset by a predetermined amount in a direction opposite to the force produced by the driving force of the solenoid.
4) Both of a pressure-increasing solenoid and a pressure-reducing solenoid are provided, and the spool push-in force by the brake pedal and the driving force produced by the pressure-increasing solenoid are applied in the same direction, and the driving force generated by the pressure-reducing solenoid is applied in the opposite direction to the spool push-in force by the brake pedal.
5) A permanent magnet is provided which applies a magnetic force to one of the end faces of the spool valve, and by reversing the direction of current supplied to the solenoid, forces attracting and repelling relative to the permanent magnet are produced in the spool valve.

There is also provided a vehicle brake system comprising a reservoir for storing brake fluid, a pressure source for storing brake fluid supplied from the reservoir with its pressure increased, wheel brakes, the hydraulic pressure control device as described above with the input port communicating with the pressure source, the output port with the wheel brakes, and the discharge port with the reservoir, and an electronic control device for computing optimum braking conditions based on information from various sensors and controlling the solenoid of the hydraulic pressure control device based on the results of computation.

Because the hydraulic pressure control device of this invention can perform, not only in an emergency but in a normal state, non-electrical pressure adjustment in which no electromagnetic force is used by transmitting the brake pedal force to the spool valve, it is possible to perform control based on the will of the driver without electronic control.

Also, since it needs no clutch for separating the spool valve from the brake pedal or no means for stopping the transmission of force in a normal state, it is possible to simplify the structure and reduce the cost. Also, since the proportional pressure control valve is integrated with the brake pedal, it is possible to simplify the piping and reduce the installation space.

Further, since the brake pedal force is applied to the spool valve from the beginning of operation, there will be no delay in response even during failure of the electric line.

With the device having a pressure-increasing solenoid, it is possible not only to generate braking force corresponding to the amount of braking, but to generate more braking force than that obtained by depressing the brake pedal and to perform automatic braking.

With the device having a pressure-decreasing solenoid, it is possible to reduce the braking force while the brake pedal is being depressed and to perform regenerative blending brake control in which in response to regenerative braking carried out in an electric vehicle, the hydraulic braking force is weakened to increase the regenerative efficiency.

If both a pressure-increasing solenoid and a pressure-reducing solenoid are provided, it is possible to cope with all of the above-described control requirements. The device in which a permanent magnet is added to the device having only one of the two solenoids has similar functions to the device having both the pressure-increasing solenoid and pressure-reducing solenoid.

With the device having output characteristics offset relative to the driving force by the solenoid, by balancing the offsetting force with the force of the solenoid to make the offsetting force apparently zero and adjusting the force of the solenoid, it is possible to perform substantially pressure-reducing control with a pressure-increasing solenoid or perform substantially pressure-increasing control with a pressure-reducing solenoid. Namely, the device having a single solenoid can have similar functions to the device having both a pressure-increasing solenoid and a pressure-reducing solenoid.

Also, since the vehicle brake system of this invention can perform adjustment of the wheel brake pressure based on the command from an electronic control device only with a single hydraulic pressure control device, it is simple, inexpensive, fewer in failure factors, and good in responsiveness in an emergency. Various kinds of controls are also possible.

Other features and objects of the present invention will become apparent from the following description made with reference to the accompanying drawings, in which:

DETAILED DESCRIPTION OF THE PREFERRED EMBODIMENT

Figure 1:
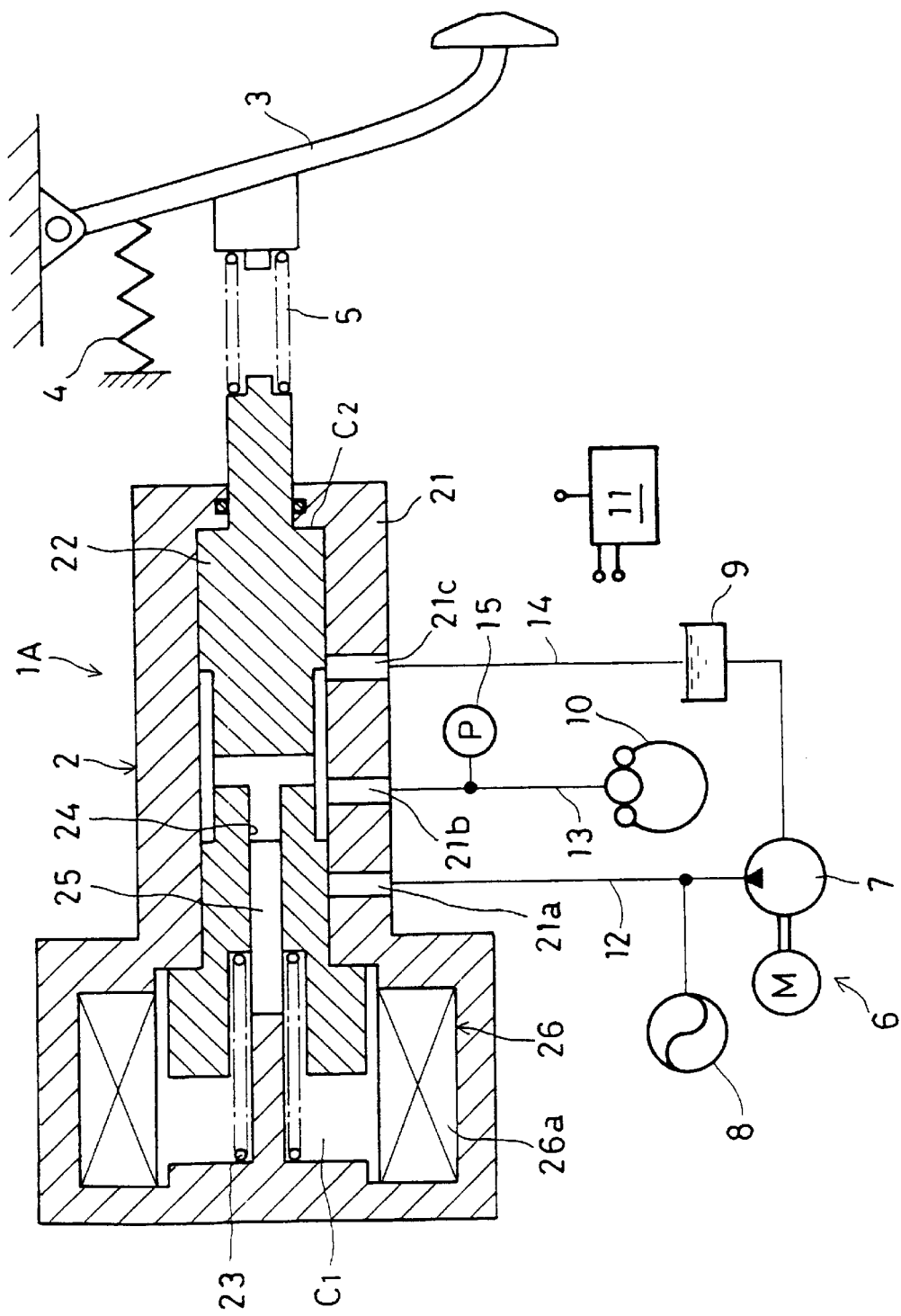
FIG. 1 is a sectional view showing a first embodiment of the hydraulic pressure control device and the brake system of this invention.

FIG. 1 shows the first embodiment of the hydraulic pressure control device according to this invention and a brake system using it.

In FIG. 1, the hydraulic pressure control device 1A comprises a proportional pressure control valve 2, a brake pedal 3, a spring 4 for applying a reactive force to the pedal and a spring 5 for transmitting the pedal operating force to a spool valve 22 of the proportional pressure control valve 2. Also included are a pressure source 6 provided with a power-driven pump 7 and a pressure accumulator 8, a reservoir 9, a wheel brake 10, and an electronic control device 11. The brake system is formed by these elements. Although there are a total of four wheel brakes 10, two at front and two at rear, only one of them is shown in the figures for simplification.

Figure 11:
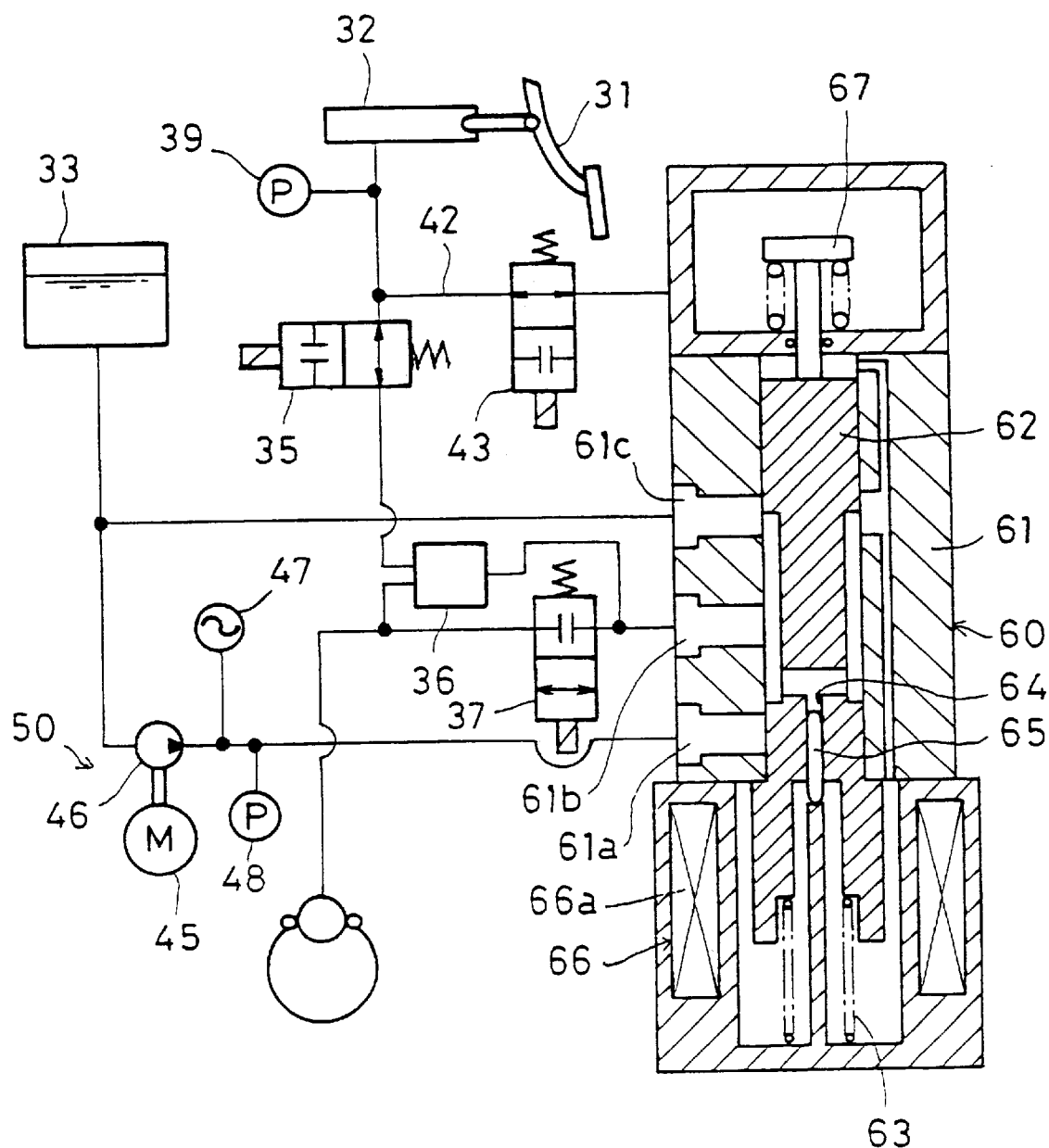
FIG. 11 is a sectional view of the proportional pressure control valve provided in the circuit of FIG. 10.

The proportional pressure control valve 2 has substantially the same structure as the one shown in FIG. 11. That is to say, the spool valve 22 is inserted in a housing 21 formed with an input port 21a, an output port 21b and a discharge port 21c with the spool valve 22 biased toward the pressure-reducing side (rightward in the figure) by a return spring 23. A pin 25 is inserted in a pin hole 24 formed in the spool valve 22 to produce a difference in sectional area equal to the sectional area of the pin 25 between the opposed pressure-bearing surfaces of the spool valve 22. A solenoid 26 is further provided for producing a spool-driving force corresponding to the current supplied to a coil 26a.

The illustrated solenoid 26 is a pressure-increasing one for applying an electromagnetic attracting force in the leftward direction in the figure to the spool valve 22.

The input port 21a of the housing 21 is connected to the pressure source 6 through a passage 12. Its output port 21b is connected to the wheel brake 10 through a passage 13, and the discharge port 21c to a reservoir 9 through a passage 14. A chamber C1 housing the return spring 23 and a chamber C2 formed on the right side of the spool valve 22 communicate with the reservoir 9, though passages which are not shown. This is true for the below-described devices, too.

The electronic control device 11 takes information necessary for controlling the behavior of the vehicle from various sensors such as a brake switch, a stroke sensor for detecting the amount of applying brake pedal, wheel speed sensors (none of them shown), and a hydraulic pressure sensor 15, computes the optimum wheel brake pressure and braking conditions, and gives a command for supplying a necessary current to the solenoid 26 of the proportional pressure control valve 2 when necessary.

In the thus structured hydraulic pressure control device 1A of FIG. 1, the spool valve 22 to which is coupled the brake pedal 3, bears the thrust force by introduced hydraulic pressure and the force of the return spring 23 in the rightward direction in the figure, and bears the push-in force due to the depressing of the brake pedal 3 and the driving force produced by the solenoid 26 in the leftward direction in the figure as an external force.

During a non-operational state in which no external force is imparted, the spool valve 22 is held in the position of FIG. 1 by the force of the return spring 23 to connect the output port 21b with the discharge port 21c.

Figure 2:
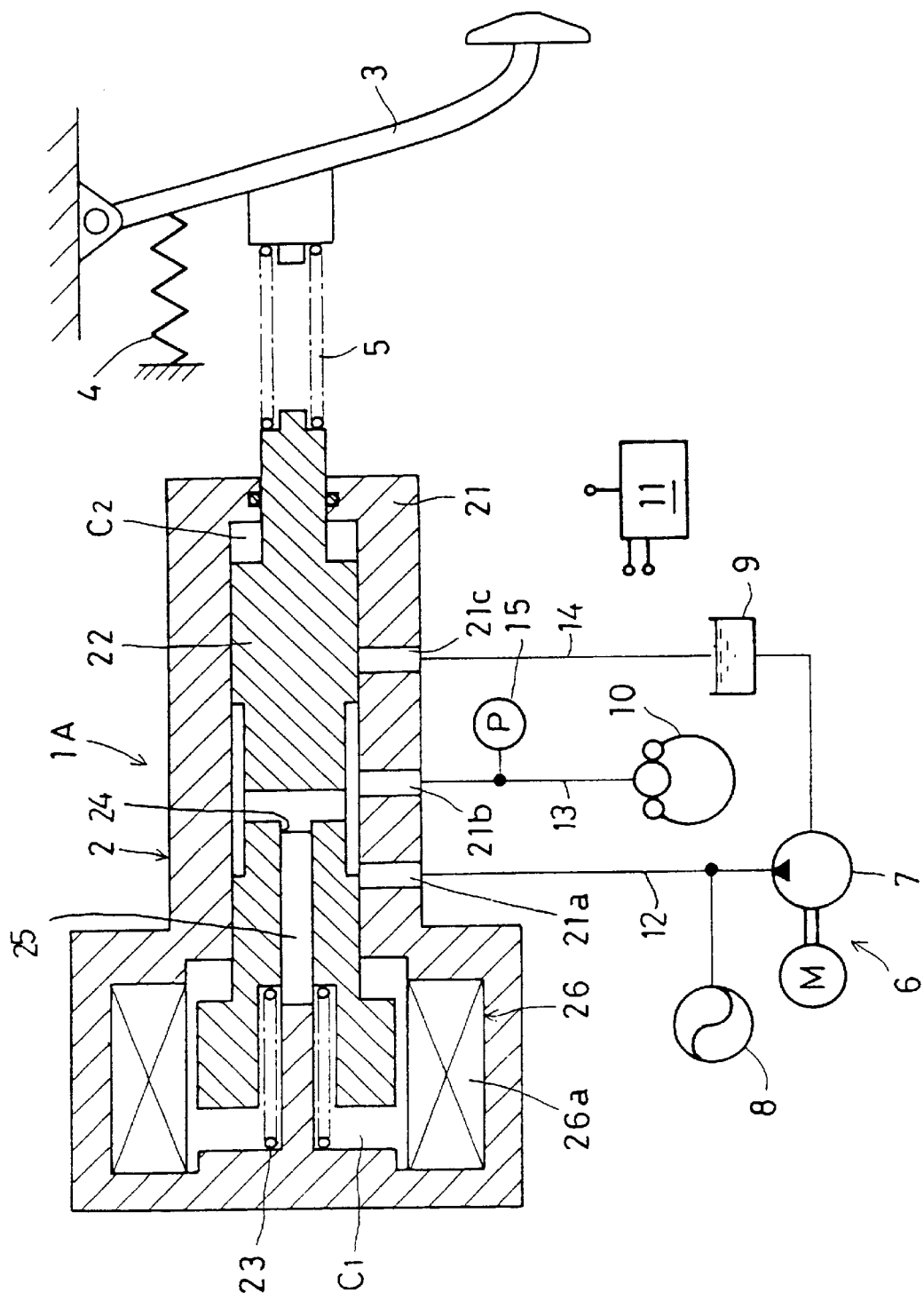
FIG. 2 is a view showing a state in which the devices of FIG. 1 are operated by a solenoid.

With this device, the state in which the brakes are applied only with the driving force by the solenoid 26 is shown in FIG. 2. While the brake pedal 3 is not operated, if the electronic control device 11 judges the necessity of braking, computes optimum wheel brake pressure and braking conditions, and gives a pressure-increase command, a current corresponding to the command will flow through the coil 26a, so that the magnetic force produced thereby pulls the spool valve 22 leftwardly in the figure and the output port 21b communicates with the input port 21a as shown. Thus, the hydraulic pressure from the pressure source 6 is adjusted to a value corresponding to the current supplied to the coil 26a and supplied to the wheel brake 10. Thus, with the illustrated device, it is possible to carry out automatic braking for vehicle stability control and automatic chasing, traction control and parking brake assisting, etc.

Figure 3:
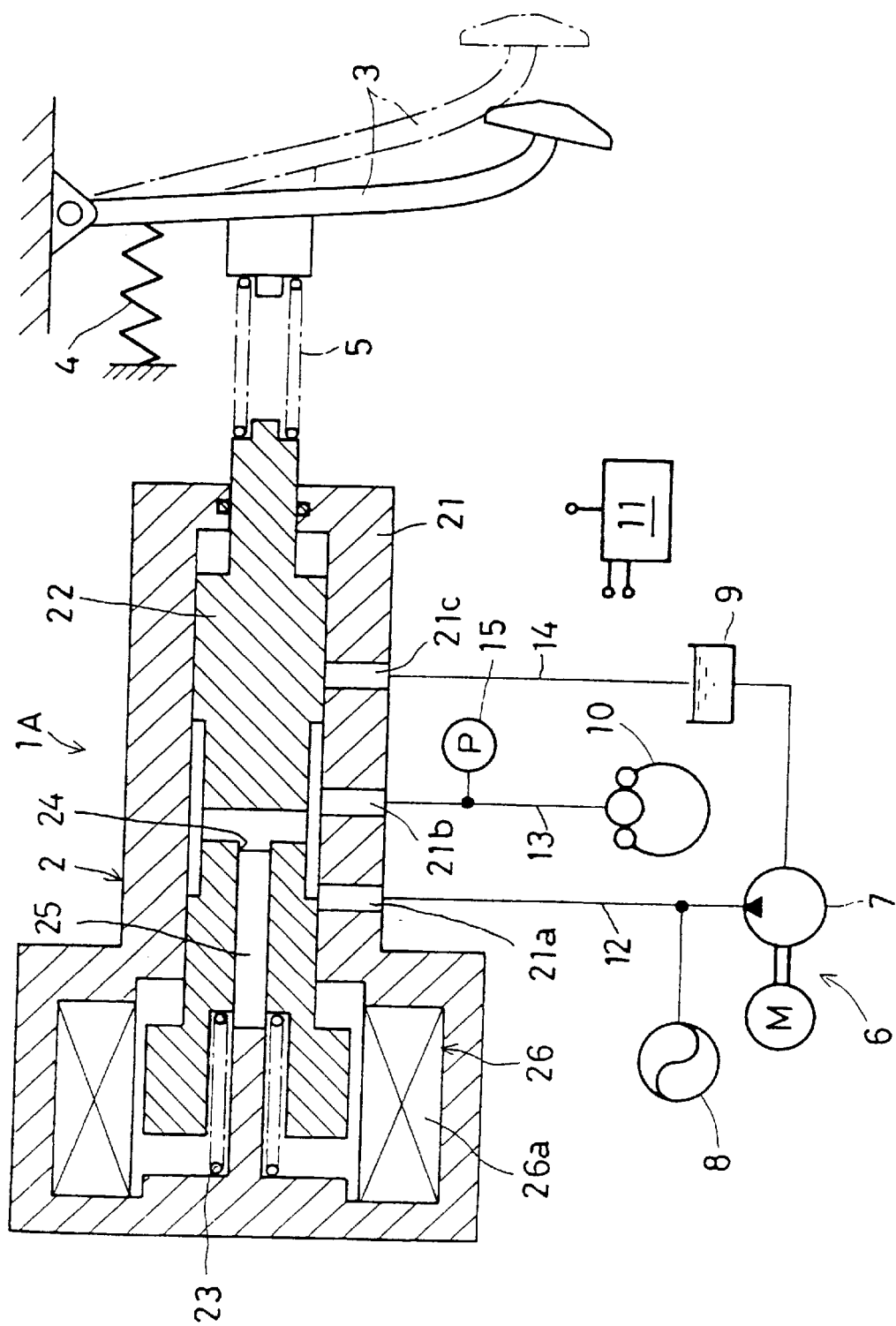
FIG. 3 is a view showing a state in which the devices of FIG. 1 are operated by a brake pedal.

FIG. 3 is a state in which the brakes are applied only by the operation of the brake pedal 3. In this way, it is possible to apply the brakes by the brake pedal force even in a normal state in which there is no trouble in the electric line or while the brake pedal force is below a predetermined amount.

Figure 4:
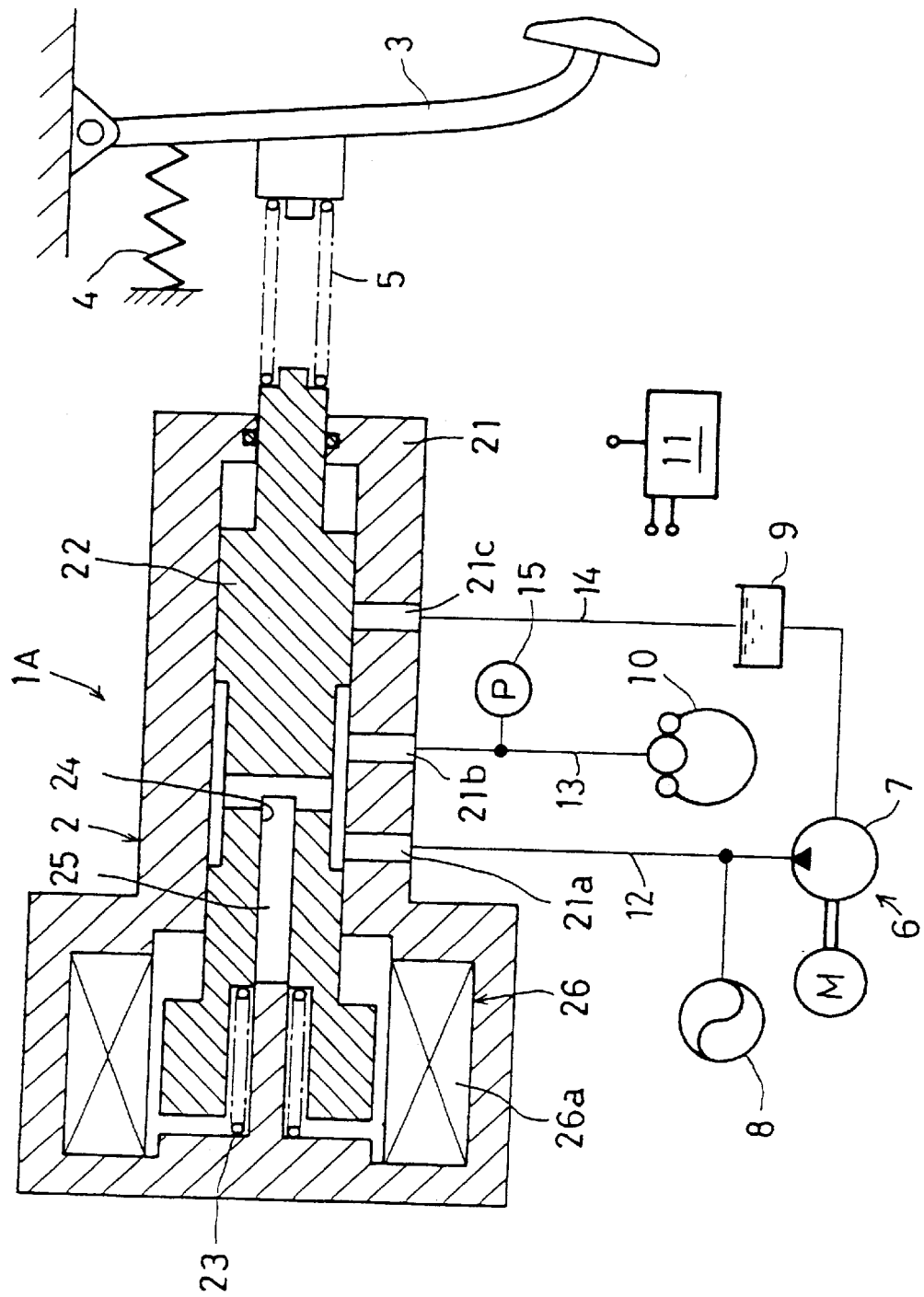
FIG. 4 is a view showing a state in which the devices of FIG. 1 are operated by both the brake pedal and the solenoid.

FIG. 4 is a state in which both the pressure application by the brake pedal 3 and the pressure increase by the solenoid 26 are used. This makes possible brake assist control in which by using the driving force by the solenoid, braking force more than when the brake pedal is depressed is obtained.

Figure 5:
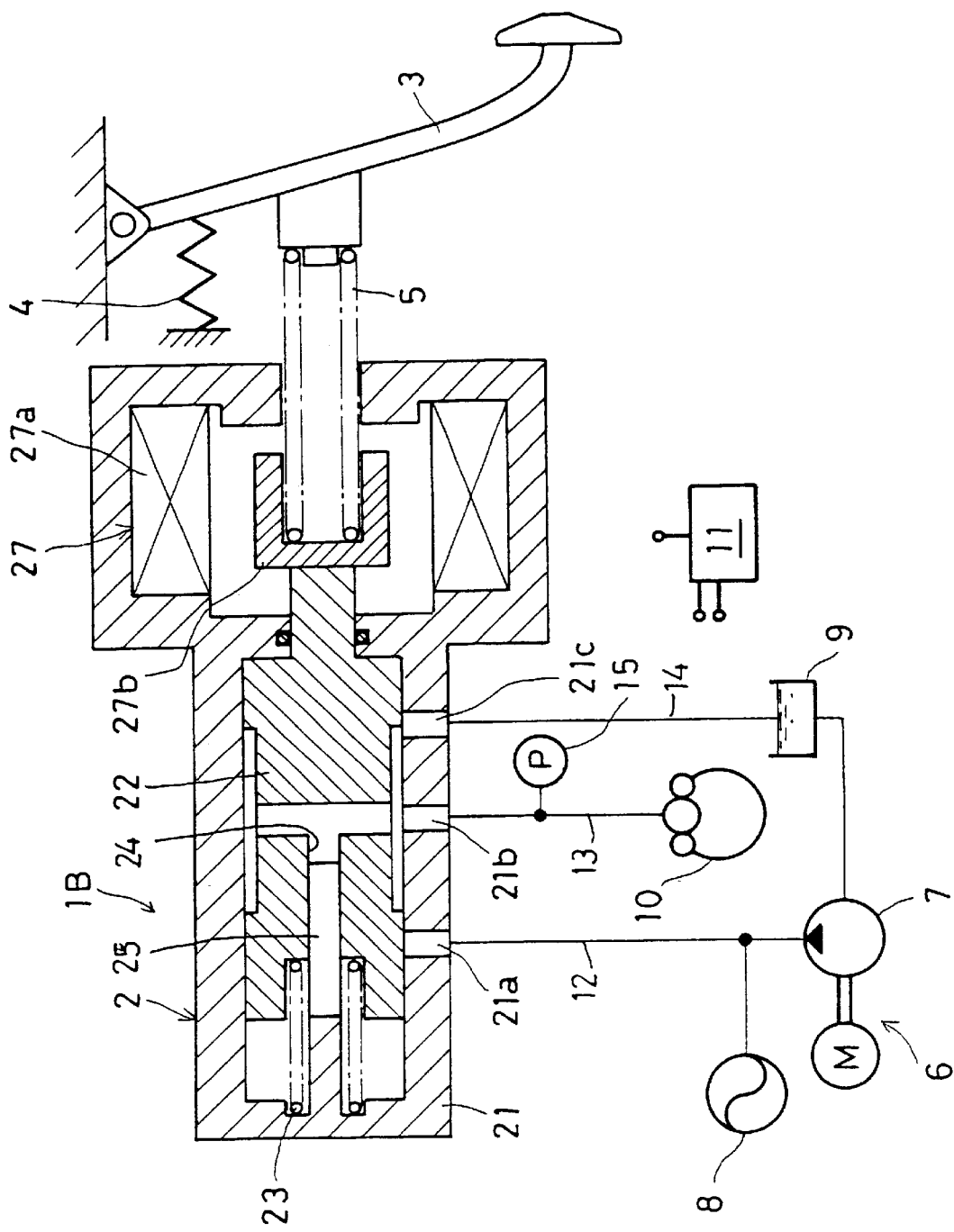
FIG. 5 is a sectional view of a second embodiment.

FIG. 5 shows a second embodiment. This hydraulic pressure control device 1B is provided with a pressure-reducing solenoid 27 instead of the pressure-increasing solenoid 26. The solenoid 27 is provided with a magnetic retainer 27b between the brake pedal 3 and the spool valve 22 to support one end of the spring 5. The retainer 27b is pulled rightwardly in the figure by the magnetic force produced by activating the coil 27a.

With the device 1B of FIG. 5, the electromagnetic force of the solenoid 27 acts as a minus external force, so that even while the driver has no intension of relaxing the brakes, it is possible to reduce the hydraulic pressure for the wheel brake 10 by returning the spool valve 22 by magnetic force of the solenoid 27 from the position where it is originally supposed to be (pressure-increasing point) to the position where the output port 21b is connected with the discharge port 21c (pressure-reducing point). Thus, it is possible to perform regenerative blending brake control, antilock control, etc.

The retainer 27b may or may not be integrated with the spool valve 22. If they are separate, since the spool valve 22 is kept pressed against the retainer 27b by the force of the return spring 23, they move together.

Figure 6:
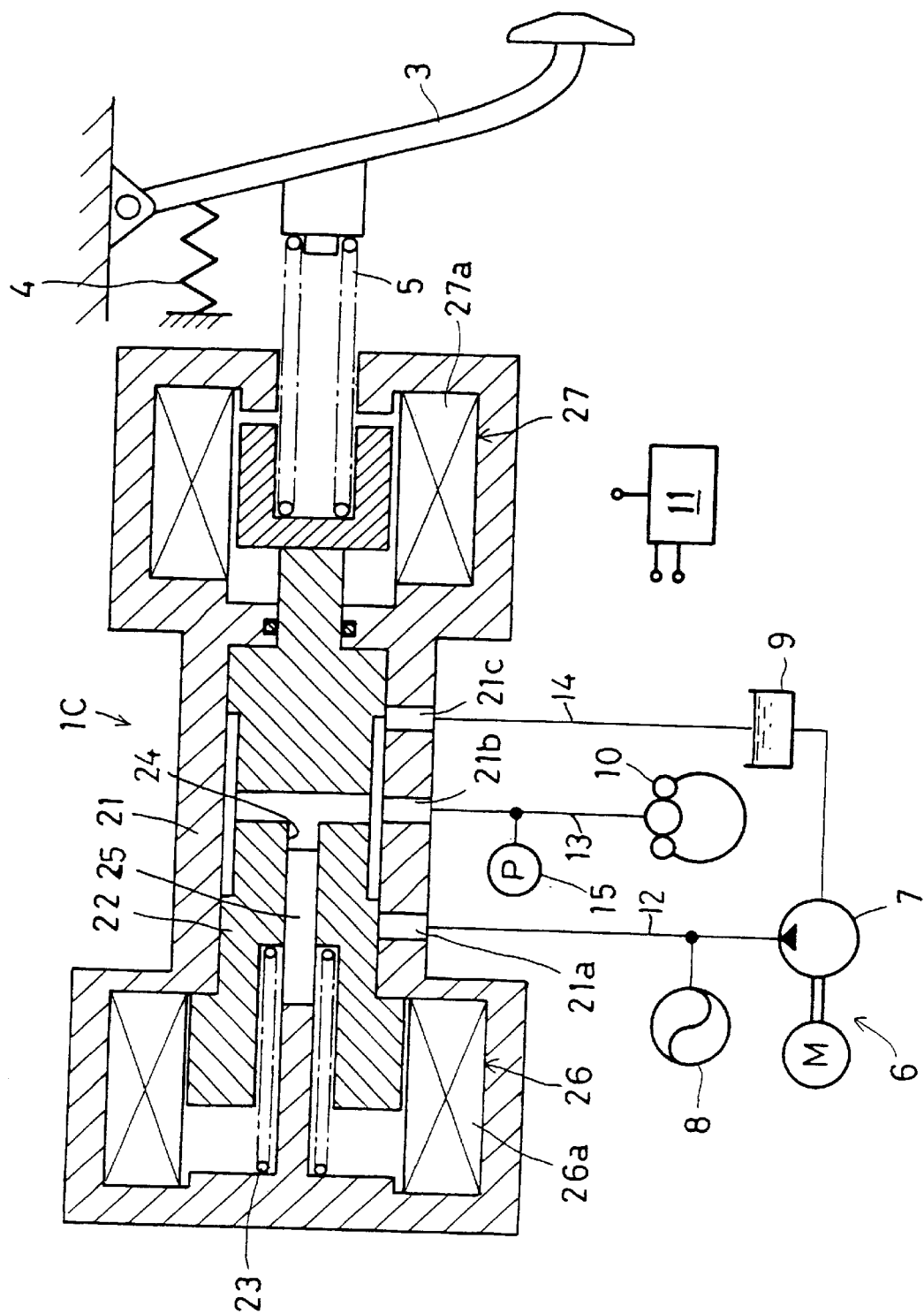
FIG. 6 is a sectional view of a third embodiment.

FIG. 6 shows a third embodiment which is provided with both the pressure-increasing solenoid 26 of FIG. 1 and the pressure-reducing solenoid 27 of FIG. 5.

This hydraulic pressure control device 1C can perform all the controls that the devices of FIGS. 1 and 5 can perform.

Figure 7:
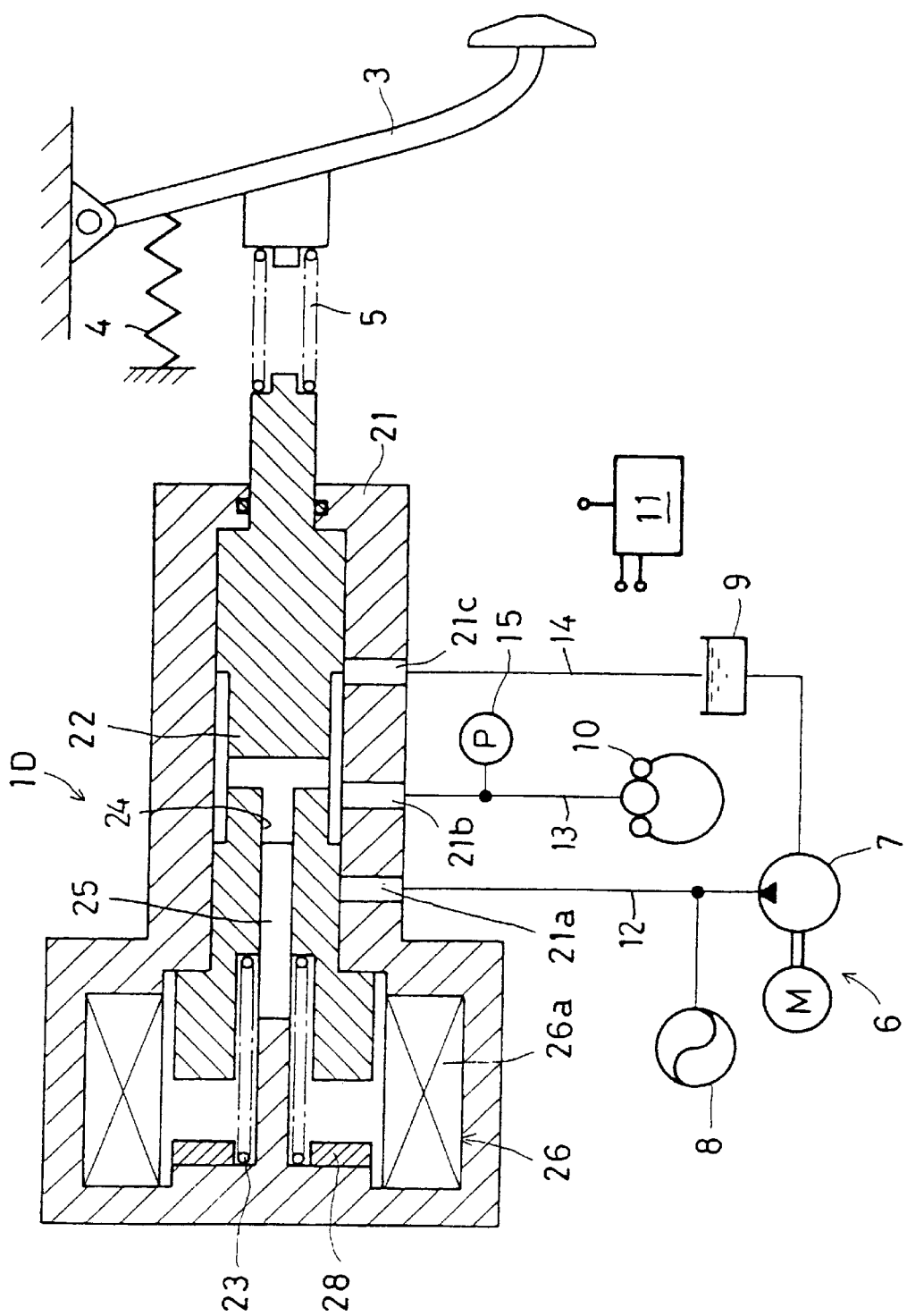
FIG. 7 is a sectional view of a fourth embodiment.

FIG. 7 shows the fourth embodiment which is a modification of the third embodiment. In this hydraulic pressure control device 1D, a permanent magnet 28 for applying a magnetic force to one end of the spool valve 22 opposite to the brake pedal-coupled side is added to the device of FIG. 1, which is provided with a pressure-increasing solenoid, to change over the direction of the current supplied to the coil 26a based on the command from the electronic control device 11. By the changeover of the direction of the current, the polarity of the magnetic pole on the end face of the spool valve 22 on the left-hand side in the figure changes, so that an attracting or repelling force relative to the permanent magnet 28 acts on the spool valve 22. Thus, it is possible to increase and reduce the spool push-in force by the brake pedal 3 with the magnetic force produced by the solenoid 26, so that it reveals the same function as the device of FIG. 6.

Figure 8:
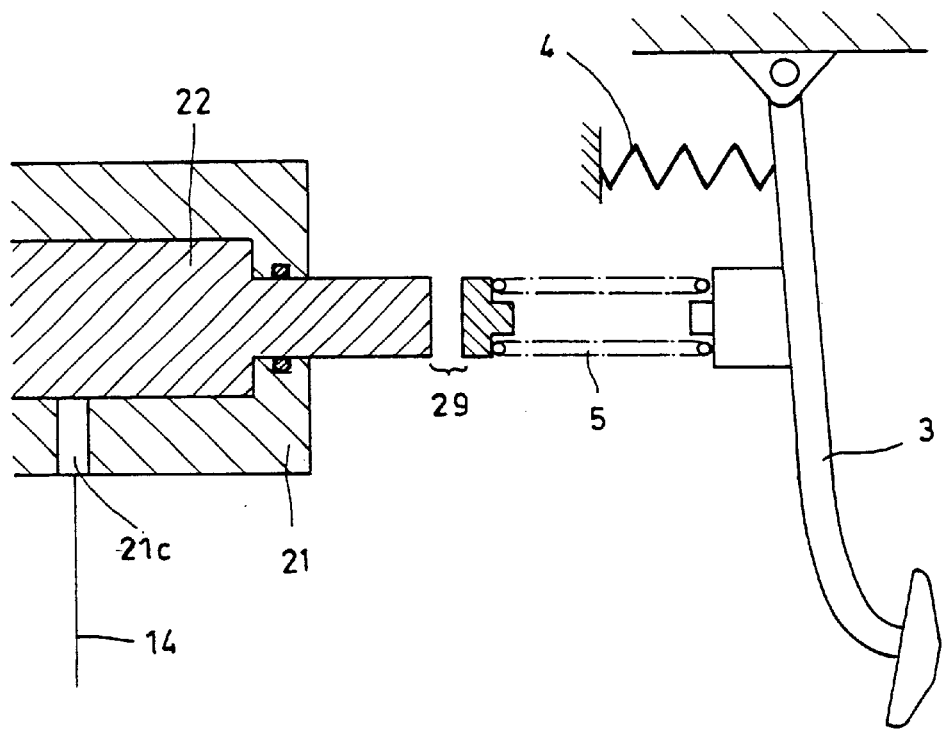
FIG. 8 is a sectional view of a modification in which a gap is added to the device of FIG. 4 to offset the output characteristics.

Next, to the hydraulic pressure control device as shown in FIG. 1, which has the pressure-increasing solenoid 26, it is possible to impart the output characteristics offset in a direction opposite to the force produced by the driving force of the solenoid, by the following arrangements:

1) The force of the input spring 5 and that of the spool valve-returning spring 23 are set so that the former is smaller than the latter.
2) As shown in FIG. 8, a gap 29 is created in e.g. the rod for transmitting the brake pedal force to the spool valve 22.
3) Both of the measures 1) and 2) are used.

Figure 9:
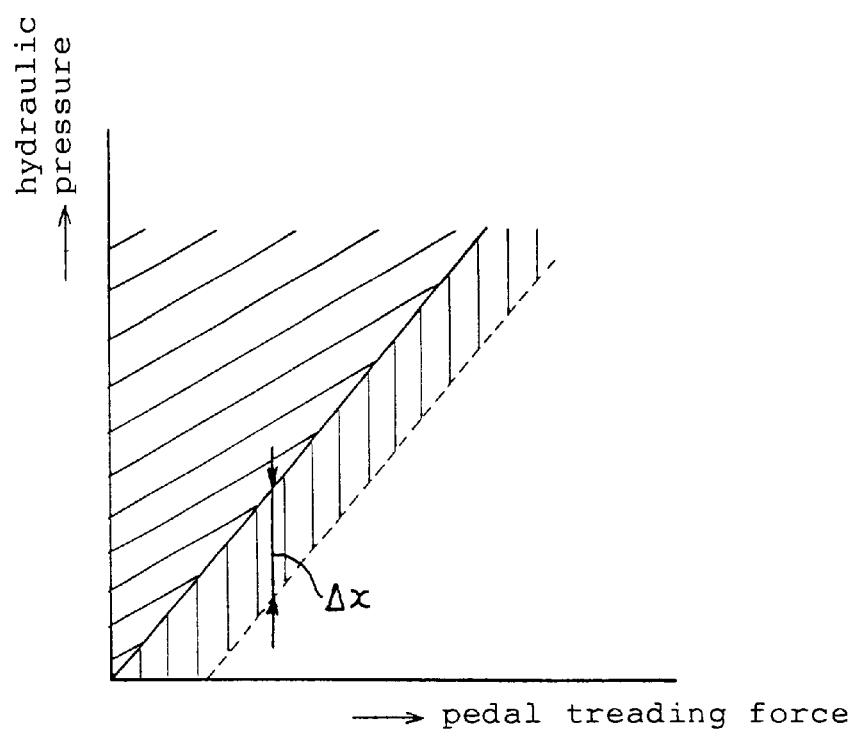
FIG. 9 is a graph showing the width of reduction of hydraulic pressure by offsetting.
Figure 10:
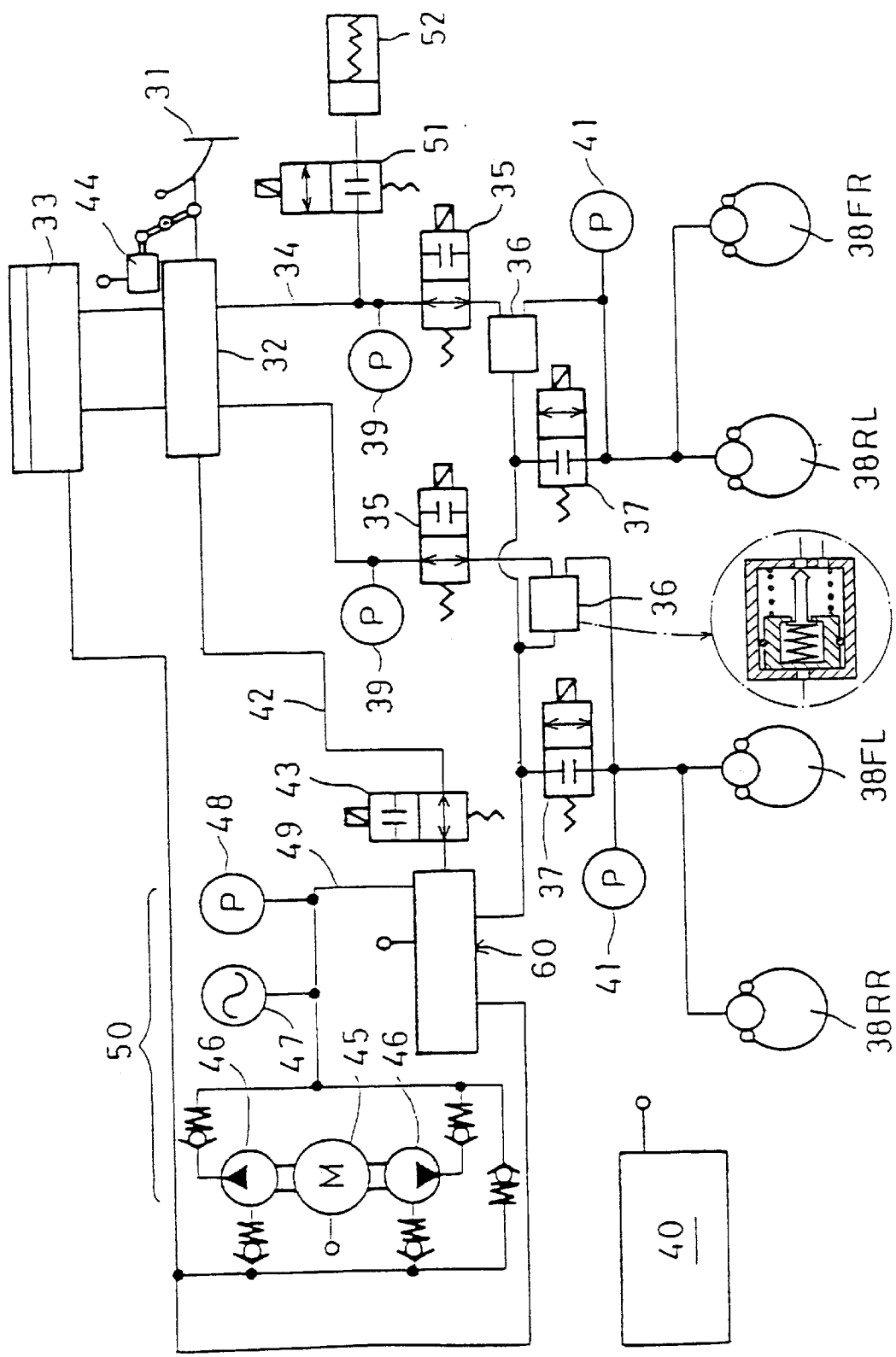
FIG. 10 is a circuit diagram of a conventional brake system.

FIG. 9 represents hydraulic pressure characteristics of the device in which these measures are taken, in which Δ x indicates a pressure reduction width by offsetting. This pressure reduction width Δ x is determined by the difference between the forces of the springs 5 and 23 if the measure 1) is taken, and by the size of the gap 29 if the measure 2) is taken. If the measure 3) is taken, it is determined both by the difference in force and the size of the gap 29.

The hydraulic pressure control device having such output characteristics is so set that in a normal braking period the hydraulic pressure indicated by the solid line in FIG. 9 will be obtained with the force which is equal to the sum of the brake pedal force and the force of the pressure-increasing solenoid 26.

With this arrangement, by increasing and decreasing the spool driving force by the pressure-increasing solenoid 26 when necessary, it is possible to carry out pressure increase control in the region above the solid line of FIG. 9, and pressure reduction control within the range of pressure reduction width Δ x. If one of the measures 1)–3) is taken, since the pressure reduction width Δ x is the limit, a dangerous situation can not occur in which the pressure drops limitlessly due to abnormal electronic control, or no braking occurs.

The hydraulic pressure control device as shown in FIG. 5, which has the pressure-reducing solenoid 27, permits pressure increase control within the range of a pressure increase width that is determined by the difference between the forces of the springs 5 and 23 if the force of the input spring 5 is set to be larger than the force of the return spring 23. During normal braking, it is adapted to cancel the difference in force of these springs with the force of the pressure-reducing solenoid 27, and if necessary, the force of the pressure-reducing solenoid 27 (which acts in such a direction as to reduce the brake pedal force) can be reduced from the level during normal braking to perform pressure increase control or increased to perform pressure reduction control.

As described above, with the hydraulic pressure control device of this invention, because non-electrical pressure adjustment by the proportional pressure control valve can be done not only in an emergency but in a normal state, it is possible to perform control based on the will of the driver without performing electronic control. Also, control not based on the will of the driver is possible. Thus, various kinds of controls can be achieved with a simple device.

Also, it is possible to reduce the cost by simplification of the structure and improve responsiveness in an emergency due to the fact that the brake pedal force always acts on the spool valve.

Further, the brake system employing the hydraulic pressure control device of this invention is small in the number of elements, so that various kinds of controls of the vehicle are possible with an inexpensive device.

Also, since a hydraulic pressure control device is used in which the proportional control valve and the brake pedal are integrated, it is possible to simplify the piping and reduce the installation space.

What is claimed is:

1. A hydraulic pressure control device for a vehicle comprising:
   a proportional pressure control valve assembly which comprises:
      a housing formed with an input port, an output port and a discharge port;
      a spool valve slidably mounted in said housing and having a passage, said spool valve being movable between a first position in which said discharge port communicates with said output port through said passage and a second position in which said output port communicates with said input port through said passage, said spool valve also being positionable at a third position between said first and second positions in which said output port communicates with neither said discharge port nor said input port;
      a return spring biasing said spool valve toward said first position;
      a solenoid that produces an electromagnetic force to bias said spool valve toward one of said first and second positions,
      said spool valve having first and second pressure bearing surfaces that bear pressure introduced into said spool valve through said input port and said passage, said first and second pressure bearing surfaces being arranged such that the pressure acting on said first pressure bearing surface biases said spool valve toward said first position and the pressure acting on said second pressure bearing surface biases said spool valve toward said second position, said first pressure bearing surface having a greater area than said second pressure bearing surface, whereby the pressure acting on said first and second pressure bearing surfaces biases said spool valve toward said first position; and
      a brake pedal coupled to said spool valve through a spring such that a force applied to the brake pedal acts on said spool valve to bias said spool valve toward said second position.

2. A hydraulic pressure control device for a vehicle as claimed in claim 1 wherein said solenoid is a pressure-applying solenoid and the driving force produced by said solenoid is applied to said spool valve in the same direction as the one in which said spool valve is pushed by the brake pedal.

3. A hydraulic pressure control device for a vehicle as claimed in claim 2 wherein said proportional pressure control valve has output characteristics offset by a predetermined amount in a direction opposite to the direction of the output produced by the driving force of said solenoid.

4. A hydraulic pressure control device for a vehicle as claimed in claim 1 wherein said solenoid is a pressure-reducing solenoid and the driving force produced by said solenoid is applied to said spool valve in the opposite direction to the direction in which said spool valve is pushed by the brake pedal.

5. A hydraulic pressure control device for a vehicle as claimed in claim 4 wherein said proportional pressure control valve has output characteristics offset by a predetermined amount in a direction opposite to the direction of the output produced by the driving force of said solenoid.

6. A hydraulic pressure control device for a vehicle as claimed in claim 1 wherein a permanent magnet is provided for applying a magnetic force to one of end faces of said spool valve, wherein by reversing the direction of current supplied to said solenoid, forces attracting and repelling relative to said permanent magnet can be applied to said spool valve.

7. A vehicle brake system comprising a reservoir for storing brake fluid, a pressure source for storing brake fluid supplied from said reservoir with its pressure increased, wheel brakes, the hydraulic pressure control device as claimed in claim 1 with said input port communicating with said pressure source, said output port with the wheel brakes, and said discharge port with said reservoir, and an electronic control device for computing optimum braking conditions based on information from various sensors and controlling said solenoid of said hydraulic pressure control device based on the results of computation.

8. A hydraulic pressure control device for a vehicle as claimed in claim 1 wherein said solenoid comprises a pressure-applying solenoid and a pressure-reducing solenoid, wherein the push-in force by the brake pedal and the driving force produced by said pressure-applying solenoid are applied in the same direction, and the driving force generated by said pressure-reducing solenoid is applied in the direction opposite to the push-in force by the brake pedal.

* * * * *